April 28, 1936.  H. SCHATTANIK  2,038,960
DEVICE FOR PRODUCING PERIODICAL CURRENT IMPULSES
Filed Nov. 28, 1934
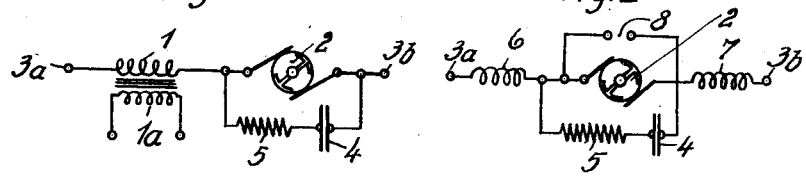
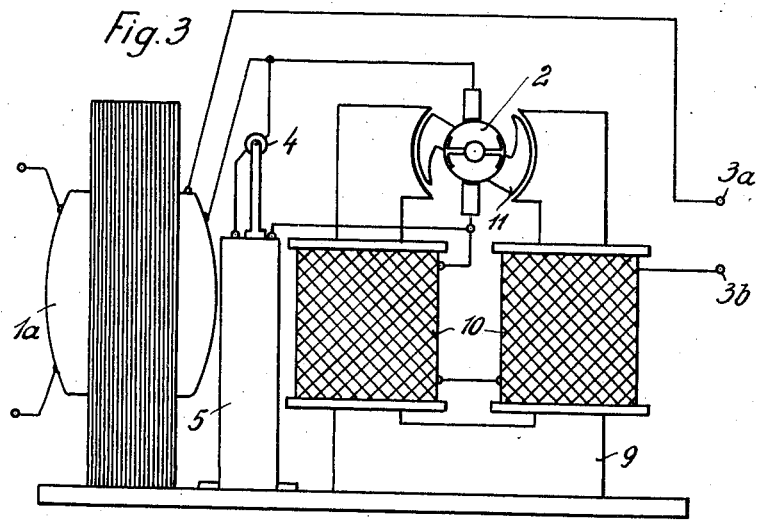
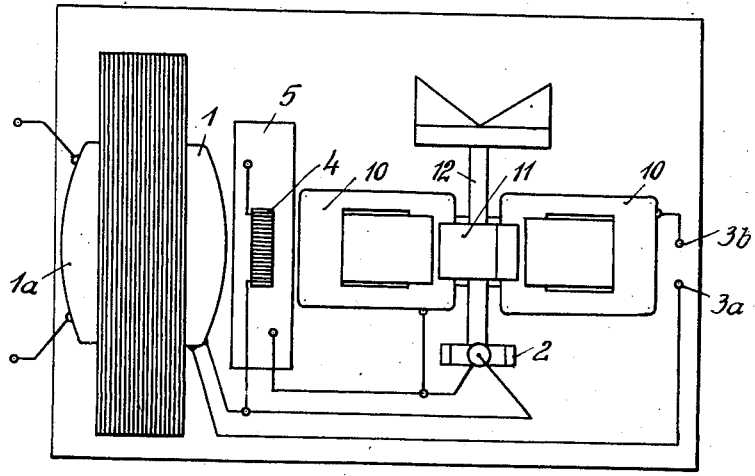
Inventor:
Heinrich Schattanik Patented Apr. 28, 1936

2,038,960

UNITED STATES PATENT OFFICE 2,038,960

DEVICE FOR PRODUCING PERIODICAL CURRENT IMPULSES

Heinrich Schattanik, Leipzig, Germany, assignor to Dr. Eugen Ostwald, Berlin-Charlottenburg, Germany Application November 28, 1934, Serial No. 755,240
In Germany November 28, 1933

3 Claims. (Cl. 175—364)

My invention relates to a device for producing periodical current impulses and particularly for converting direct current into high voltage alternating current or for converting an alternating current into an alternating current the frequency of which is a multiple of the frequency of the current to be converted.

Devices of this kind comprise a mechanical interrupter connected in series to an inductance, for instance a transformer, the interrupter being designed as an oscillating contact blade, a rotary collector or the like.

Devices of the kind referred to involve the drawback that considerable sparking occurs at the contacts of the interrupter so that the interruption of the current will be unsatisfactory and the contacts will be subjected to considerable wear. In order to overcome this difficulty it has been proposed to connect a condenser in parallel to the interrupter. By doing so, however, the sparking is not satisfactorily suppressed. Besides this the condenser is subjected to heavy current and voltage impacts caused by the extra current fed by the inductance so that often the condenser will break down after a short time of operation.

My invention avoids these drawbacks and consists in connecting a phase shifter in shunt to the interrupter. In doing so I obtain a practically sparkless running of the interrupter. On the other hand the construction of the device will not become more expensive by providing the phase shifter since the condenser forming part of the phase shifter need not as high a capacity and disruptive strength as the condensers connected in parallel to the interrupter in the devices known in the art.

Preferably the phase shifter is adjusted to a phase difference of 90° with respect to the natural frequency of the inductive system of the device since then the extra current will be substantially entirely suppressed.

In the drawing affixed to this specification and forming part thereof some embodiments of my invention are illustrated diagrammatically by way of example.

In the drawing:

Figs. 1 and 2 are wiring diagrams of two embodiments of my invention,

Figs. 3 and 4 are side elevation and a plan view of another embodiment of my invention.

Referring now to the drawing and first to Fig. 1 3a and 3b are the terminals of the line supplying the current to be converted which may be a direct current line. Across these terminals the primary 1 of a transformer and a rotary current interrupter 2 are connected in series to each other. 4 is a condenser and 5 a resistance connected in series to each other and forming a phase shifter connected in shunt to the current interrupter. 1a is the secondary winding of the transformer.

The operation of this device is as follows:

The current to be converted, for instance a direct current, is supplied from the terminals 3a, 3b to the primary 1 of the transformer, the current being periodically interrupted by means of the rotary interrupter 2 which is driven by a suitable motor an embodiment of which will be described hereinafter in connection with Figs. 3 and 4. The periodical current variations in the primary 1 which are caused by the periodical interruption of the current by means of the interrupter 2 induce an alternating current in the transformer secondary 1a from which the converted current is fed to a current consumer (not shown). Sparking at the contacts of the current interrupter 2 is suppressed by the phase shifter consisting of the condenser 4 and the resistance 5 which are dimensioned or adjusted so as to suppress the extra current fed by the transformer primary 1.

Referring now to Fig. 2 the inductance connected in series to the rotary interrupter 2 is subdivided into two portions 6 and 7, the interrupter being inserted between these portions. In this embodiment the converted current is taken from terminals 8 directly connected to the terminals of the interrupter. The operation of this device is on the principle the same as that of the device shown in Fig. 1. By arranging the interrupter 2 and the phase shifter 4, 5 connected in parallel thereto between the portions 6 and 7 of the inductance the potentials against ground to which the phase shifter is subjected are lower than those arising in the connection shown in Fig. 1, so that a weaker insulation against ground of the phase shifter is sufficient.

Referring now to Figs. 3 and 4 the rotary interrupter 2 is mounted on the shaft 12 of the armature 11 of a small motor the stator 9 of which carries an exciting winding 10 connected in series between terminal 3b and the rotary interrupter 2. This motor is more fully described in my copending patent application Serial No. 755,239 filed together with this application. The interrupter 2 operates as a collector of the motor which is provided with a Z-shaped armature so that the wave form of the current is approximated to a sinusoidal form. This effect is improved by providing the phase shifter 4, 5 according to my invention by which the steep peaks caused by the extra current are suppressed. In consequence thereof the device according to my invention is particularly useful in operating alternating current receivers from a direct current line and for feeding discharge lamps from direct current lines or alternating current lines having a low frequency, flickering of the lamps being avoided. A device according to my invention may also be used as a frequency multiplier. In this case preferably the motor shown in Figs. 3 and 4 is replaced by a small synchronous motor driving an interrupter designed as a suitably subdivided collector.

In Figs. 3 and 4 the primary 1 of the transformer is shown connected in series to the motor winding 10. If desired, however, the transformer may be connected in parallel to the motor.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A device for producing periodical current impulses comprising two inductances, a mechanical current interrupter seriatim connected between said inductances and a phase shifter connected in shunt to said interrupter.

2. A device for producing periodical current impulses comprising two substantially equal inductances, a mechanical current interrupter seriatim connected between said inductances and a phase shifter connected in shunt to said interrupter.

3. A device for producing periodical current impulses comprising a mechanical current interrupter, an induction coil connected in series with said interrupter, and a phase shifter adjusted to a phase displacement of about 90 degrees with respect to the natural frequency of the induction coil, said phase shifter consisting of a condenser in serial connection with a resistance.

HEINRICH SCHATTANIK.